(12) United States Patent
Certain

(10) Patent No.: US 7,149,646 B2
(45) Date of Patent: Dec. 12, 2006

(54) PILOT INDICATOR FOR PREDICTING CHANGES IN THE SPEED OF ROTATION OF THE MAIN ROTOR OF A ROTORCRAFT

(75) Inventor: Bernard Certain, Aix en Provence (FR)

(73) Assignee: Eurocopter, Marignane (FR)

( * ) Notice: Subject to any disclaimer, the term of this patent is extended or adjusted under 35 U.S.C. 154(b) by 0 days.

(21) Appl. No.: 11/147,211

(22) Filed: Jun. 8, 2005

(65) Prior Publication Data

US 2006/0030975 A1 Feb. 9, 2006

(30) Foreign Application Priority Data

Jun. 15, 2004 (FR) .................................. 04 06492

(51) Int. Cl.
*G01P 5/00* (2006.01)
*G01C 23/00* (2006.01)

(52) U.S. Cl. ..................................... 702/144

(58) Field of Classification Search ................. 702/144
See application file for complete search history.

(56) References Cited

U.S. PATENT DOCUMENTS 5,831,429 A * 11/1998 Germanetti .................. 324/161
2004/0176902 A1* 9/2004 McBrien et al. ............. 701/100

* cited by examiner

*Primary Examiner*—John Barlow
*Assistant Examiner*—Cindy D. Khuu
(74) *Attorney, Agent, or Firm*—Young & Thompson

(57) ABSTRACT

The present invention relates to a pilot indicator for a rotorcraft provided with a main rotor and at least one gas turbine engine. The indicator has first and second sensors delivering information relating respectively to a first speed of rotation Nr corresponding to said main rotor, and a second speed of rotation NTL corresponding to the free turbine of said engine. The indicator is also provided with display means provided with a display screen for displaying the first and second present values respectively for the first and second speeds of rotation Nr and NTL. In addition, said processor means determines an estimated value for the first speed of rotation Nr.

9 Claims, 1 Drawing Sheet

PILOT INDICATOR FOR PREDICTING CHANGES IN THE SPEED OF ROTATION OF THE MAIN ROTOR OF A ROTORCRAFT

The present invention relates to a pilot indicator for a rotorcraft having a main rotor for lift and propulsion and at least one engine, such as a gas turbine engine, for example.

BACKGROUND OF THE INVENTION

The indicator serves to display the present values of a first speed of rotation corresponding to the main rotor and a second speed of rotation corresponding to the free turbine of the engine, respectively written Nr and NTL by the person skilled in the art, while also being capable of predicting changes in the first speed of rotation during stages in which the engine is accelerating or decelerating, referred to as "transient" stages. Such an indicator is more specifically adapted to a helicopter.

In a rotorcraft, such as a helicopter, it is necessary to measure and display on the pilot's instrument panel, both the first speed of rotation, corresponding to the main rotor, and the second speed of rotation, corresponding to the free turbine(s) of the engine(s).

A first system is known for a single-engine rotorcraft, that displays the first and second speeds of rotation Nr and NTL on a display screen by means of respective first and second needles. During normal operation of the rotorcraft, the two needles are aligned, i.e. they are superposed. Loss of needle alignment indicates that there is a mechanical problem in the power transmission assembly of the engine, e.g. in the main transmission gearbox.

A variation of that system for use in a two-engine rotorcraft displays the first speed of rotation, corresponding to the main rotor, and also the second speeds of rotation, corresponding to the free turbines of each of the engines, which implies using three distinct needles.

As mentioned above, such commonplace systems enable the pilot to detect a possible mechanical problem situated in the power transmission unit.

In addition, when the first speed of rotation Nr crosses a limit threshold, whether a maximum or a minimum, an audible alarm is issued so that the pilot can change the maneuver being performed. This alarm is of great importance since the first speed of rotation Nr is vital for flight safety, too slow a speed leading to loss of lift, for example.

Although they are effective, those prior art systems turn out to be insufficient in preventing the first speed of rotation Nr, corresponding to the main rotor, dropping or increasing too quickly. Experience shows, e.g. when maneuvering too fast, that the first speed of rotation Nr can exceed its maximum limit threshold in a length of time that is shorter than the reaction time of the pilot, which can lead to a situation that is catastrophic.

OBJECTS AND SUMMARY OF THE INVENTION

An object of the present invention is thus to propose a pilot indicator for a rotorcraft serving to predict changes in the first speed of rotation Nr, corresponding to the main rotor, so as to enable the pilot to modify a maneuver, where necessary, in reasonable time.

In the invention, a pilot indicator for a rotorcraft provided with a main rotor and at least one gas turbine engine for propulsion or even lift, comprises first and second sensors delivering information relating respectively to a first speed of rotation Nr corresponding to said main rotor and to a second speed of rotation NTL corresponding to the free turbine of said engine. The indicator is also provided with processor means for processing the information coming from the first and second sensors and with display means provided with a display screen for displaying the first and second present values respectively of the first and second speeds of rotation.

The invention is remarkable insofar as the processor means determine an estimated value for the first speed of rotation Nr. Thus, the estimated value represents a prediction of the value that is going to be reached by the first speed of rotation Nr in the short term. When this estimated value crosses a limit threshold, whether a maximum threshold or a minimum threshold, the processor means issues a warning signal, that is audible and/or visible.

In this way, the pilot of the aircraft knows in advance whether the first speed of rotation Nr is going to exceed one of the limits set by the manufacturer. Under such conditions, the pilot has enough time to modify the maneuver in order to avoid any incident.

In the invention, during acceleration of the engine, the processor means determines the estimated value from the following predictive relationship in acceleration, in which IPT, Nr, k, and dNr/dt correspond respectively to the estimated value of the first speed of rotation, the first present value of the first speed of rotation, a multiplier coefficient, and the variation of the present first value during a time interval:

$$IPT = Nr + \left(k\frac{dNr}{dt}\right)^4$$

Furthermore, during deceleration of the engine, the processor means determines the estimated value from the following predictive relationship in deceleration, in which IPT, Nr, k, and dNr/dt correspond respectively to the estimated value of the first speed of rotation, the first present value of the first speed of rotation, a multiplier coefficient, and the variation of the present first value during a time interval:

$$IPT = Nr - \left(k\frac{dNr}{dt}\right)^4$$

In addition, in order to ensure that the predictive relationship in acceleration and in deceleration are representative, the multiplier coefficient lies in the range 0 to 0.5. This coefficient depends on the engine in question, and it is determined by testing performed by the manufacturer, and is preferably 0.082.

The pilot indicator based on the above-described predictive relationship operates correctly, in particular for normal maneuvers. However, an analysis of test results has shown us that during sudden maneuvers, e.g. a large increase in the pitch of the blades of the main rotor of a helicopter, the estimated value can be exaggeratedly high.

To avoid this phenomenon, the processor means limit the estimated value by determining a maximum estimated value. As for the multiplier coefficient, this maximum estimated value depends on the engine and is determined by tests performed by the manufacturer. It is preferably equal to the first speed of rotation Nr plus:

10 revolutions per minute (rpm) when the first speed of rotation Nr is less than 360 rpm;

20 rpm when the first processor means Nr lies in the range 360 rpm to 410 rpm; and 10 rpm when the first speed of rotation Nr is greater than 410 rpm.

BRIEF DESCRIPTION OF THE DRAWING

The invention and its advantages appear in greater detail in the following description of an embodiment given by way of illustration with reference to the accompanying figures, in which.

MORE DETAILED DESCRIPTION

Figure 1:
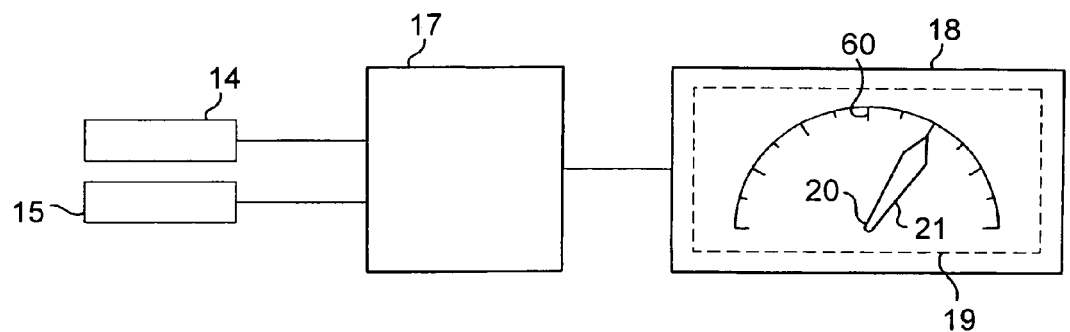
FIG. 1 is a diagrammatic view of a pilot indicator of the invention.

FIG. 1 is a diagrammatic view of a pilot indicator 13 of the invention for use in a rotorcraft provided with a single gas turbine engine and a main rotor for providing lift and forward drive.

First and second sensors 14 and 15 are provided for independently delivering information to processor means 17, said information relating respectively to a first speed of rotation Nr, corresponding to the main rotor, and a second speed of rotation NTL, corresponding to the free turbine of the engine.

The processor means 17 reduces the first and second present values respectively for the first and second speeds of rotation Nr and NTL to a comparable scale and forwards them to a display means 18. The display means then displays the first and second present values on a display screen provided with graduations 60, e.g. via respective first and second needles 20 and 21.

In normal operation, the first and second needles 20 and 21 are in alignment, i.e. they are superposed. However, if a mechanical problem arises in the power transmission unit, then these needles move out of alignment, thus enabling the pilot to become aware of an incident.

Furthermore, the processor means 17 also determines the estimated value for the first speed of rotation Nr.

To do this, during acceleration of the engine, the processor means determines the estimated values on the basis of the following predictive relationship in acceleration, in which IPT, Nr, k, and dNr/dt correspond respectively to the estimated value of the first speed of rotation, the first present value of the first speed of rotation, a multiplier coefficient, and variation in the present first value over a time interval:

$$IPT = Nr + \left(k\frac{dNr}{dt}\right)^4$$

In contrast, during deceleration of the engine, the processor means calculate the estimated value from the following predictive relationship in deceleration, in which IPT, Nr, k, and dNr/dt correspond respectively to the estimated value of the first speed of rotation, the first present value of the first speed of rotation, a multiplier coefficient, and variation in the present first value over a time interval:

$$IPT = Nr - \left(k\frac{dNr}{dt}\right)^4$$

In order to ensure that the predictive relationships in acceleration and in deceleration are representative, the multiplier coefficient k lies in the range 0 to 0.5. It is determined by tests performed by the manufacturer, and its value is preferably 0.082.

Furthermore, if the estimated value exceeds a limit threshold set by the manufacturer, whether a maximum limit or a minimum limit, the processor means issues a warning signal that is audible and/or visible. Thus, by being warned in advance that the first speed of rotation Nr is going to be either too great or too small, the pilot can take the necessary measures to avoid putting the rotorcraft in danger. Simulations show that the saving in time is sufficient to satisfy the requirements.

Figure 2:
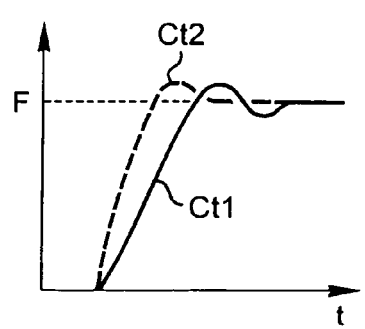
FIG. 2 is a graph showing how the present first value and the estimated first value vary as a function of time.

FIG. 2 is a graph showing variation in the present first value and variation in the estimated value as a function of time during acceleration of the engine.

A curve Ct1 shows variation in the first present value, i.e. the value of the first speed of rotation Nr at a given instant. It increases progressively and then oscillates in transient manner prior to stabilizing on a final value F.

A curve Ct2 shows variation in the estimated value. Its shape is substantially identical to that of the curve Ct1. The prediction thus performed serves to obtain the final value F in advance which, as mentioned above, provides the pilot with great help from the decision-making point of view.

Figure 3:
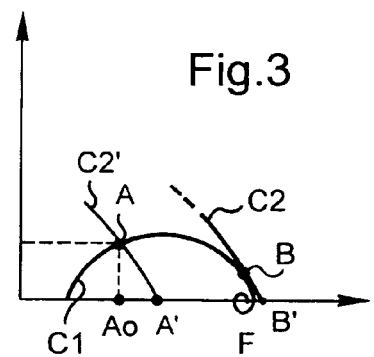
FIG. 3 is a graph showing how the derivative of the present first value varies and showing the predictive relationship in acceleration at two distinct instants.

FIG. 3 is a graph showing the variation in the derivative of the present first value (curve C1) as a function of the present first value during acceleration of the engine, and it also shows the predictive relationship in acceleration at two distinct instants (curve C2' at instant A and curve C2 at instant B).

At instant A, the first present value is A0 and the estimated value A'. This estimated value is still not representative of the final value F that will be reached by the first present value at the end of the maneuver. Nevertheless, it gives an indication that is correct insofar as it lies between the value A0 at instant A and the final value F.

From instant B, the prediction made by the processor means 17 via the above-described predictive relationship in acceleration is accurate since the estimated value B' is then very close to the final value F. As a result, if the warning signal is issued, it is representative of an indication that is accurate and realistic concerning the forthcoming situation.

Nevertheless, during a sudden maneuver, e.g. leading to the engine accelerating hard, the prediction can be of insufficient accuracy, by misleadingly determining an estimated value that is too high.

Figure 4:
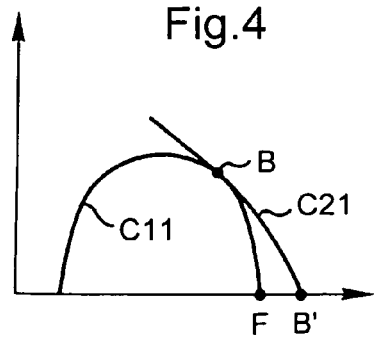
FIG. 4 is a graph showing the need to limit the estimated value under certain circumstances.

To illustrate this possibility, reference can be made to FIG. 4 where the curves C11 and C21 represent respectively variation in the derivative of the first present value as a function of the first present value and the predictive relationship in acceleration at instant B.

Since the acceleration of the engine is hard, unlike the preceding example, the estimated value B' at instant B is much greater than the final value F of the limiting parameter.

Figure 5:
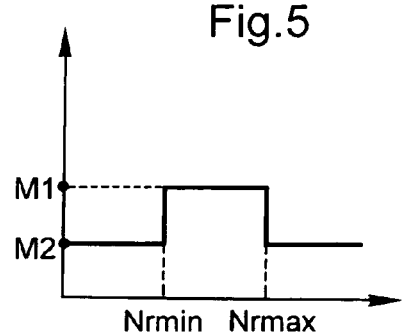
FIG. 5 is a graph showing the maximum increases in the estimated value.

To remedy this drawback, the processor means 17 limits the estimated value by limiting it to a maximum estimated value, as shown in FIG. 5.

To do this, the processor means 17 uses the diagram of FIG. 5 which shows a maximum allowable increase as a function of the first speed of rotation Nr. The maximum estimated value is then equal to the first speed of rotation Nr plus the maximum allowable increase.

When the first speed of rotation Nr is less than a minimum speed of rotation Nrmin or greater than a maximum speed of rotation Nrmax, the increase is equal to M2. Similarly, if the first speed of rotation Nr lies between the maximum speed Nrmax and the minimum speed Nrmin, then the increase is M1.

Preferably, the maximum estimated value is equal to the first speed of rotation Nr plus:

10 rpm when the first speed of rotation Nr is less than 360 rpm;

20 rpm when the first processor means Nr lies in the range 360 rpm to 410 rpm; and 10 rpm when the first speed of rotation Nr is greater than 410 rpm.

Naturally, the present invention can be implemented in a wide variety of ways. Although one implementation is described above, it will readily be understood that it is not conceivable to identify exhaustively all possible implementations. It is naturally possible to envisage replacing any of the means described by equivalent means without going beyond the ambit of the present invention.

What is claimed is:

1. A pilot indicator for a rotorcraft provided with a main rotor and at least one gas turbine engine, the indicator comprising:

first and second sensors delivering information relating respectively to a first speed of rotation Nr corresponding to the main rotor and a second speed of rotation NTL corresponding to the free turbine of said engine;

processor means for processing the information from said first and second sensors; and display means provided with a display screen for displaying the first and second present values respectively of the first and second speeds of rotation Nr and NTL, wherein said processor means determines an estimated value for the first speed of rotation Nr, and wherein, during acceleration of the engine, said processor means determines said estimated value from the following predictive relationship in acceleration, in which IPT, Nr, k, and dNr/dt correspond respectively to said estimated value of said first speed of rotation, said first present value of said first speed of rotation, a multiplier coefficient, and the variation of said present first value during a time interval:

$$IPT = Nr + \left(k\frac{dNr}{dt}\right)^4.$$

2. A pilot indicator according to claim 1, wherein, during deceleration of the engine, said processor means determines said estimated value from the following predictive relationship in deceleration, in which IPT, Nr, k', and dNr/dt correspond respectively to said estimated value of said first speed of rotation, said first present value of said first speed of rotation, a second multiplier coefficient, and the variation of said present first value during a time interval:

$$IPT = Nr - \left[\left[\left(k\frac{dNr}{dt}\right)^4\right]\right]\left(k'\frac{dNr}{dt}\right)^4.$$

3. A pilot indicator according to claim 2, wherein said second multiplier coefficient k' lies in the range 0 to 0.5.

4. A pilot indicator according to claim 1, wherein said multiplier coefficient k lies in the range 0 to 0.5.

5. A pilot indicator according to claim 4, wherein said multiplier coefficient k is substantially equal to 0.082.

6. A pilot indicator according to claim 1, wherein said processor means limits said estimated value by determining a maximum estimated value.

7. A pilot indicator according to claim 6, wherein said maximum estimated value is equal to said first speed of rotation Nr, plus:

10 rpm when the first speed of rotation Nr is less than 360 rpm;

20 rpm when the first processor means Nr lies in the range 360 rpm to 410 rpm; and 10 rpm when the first speed of rotation Nr is greater than 410 rpm.

8. A pilot indicator according to claim 1, wherein said processor means issues an audible warning signal when said estimated value crosses a limit threshold.

9. A pilot indicator according to claim 1, wherein said processor means issues a visual warning signal when said estimated value crosses a limit threshold.

* * * * *